United States Patent [19]
Ohuchi et al.

[11] Patent Number: 6,087,736
[45] Date of Patent: Jul. 11, 2000

[54] COMMUNICATION SYSTEM FOR VEHICLE

[75] Inventors: Katsuhiro Ohuchi; Morio Sato, both of Saitama, Japan

[73] Assignee: Honda Giken Kogyo Kabushiki Kaisha, Tokyo, Japan

[21] Appl. No.: 09/015,941

[22] Filed: Jan. 30, 1998

[30] Foreign Application Priority Data

Jan. 31, 1997 [JP] Japan ................................. 9-018392

[51] Int. Cl.[7] ....................................................... H04J 3/10
[52] U.S. Cl. ......................... 307/10.1; 381/103; 370/445; 455/501
[58] Field of Search ........................... 307/10.1; 381/103; 370/445; 455/501; 180/167; 330/301, 116, 117; 333/4, 5

[56] References Cited

U.S. PATENT DOCUMENTS

| | | | |
|---|---|---|---|
| 4,829,554 | 5/1989 | Barnes et al. ............................. | 455/432 |
| 5,251,211 | 10/1993 | Mutoh et al. ............................. | 370/445 |
| 5,495,469 | 2/1996 | Halter et al. ............................. | 370/212 |
| 5,727,074 | 3/1998 | Hildebrand ............................... | 381/103 |

FOREIGN PATENT DOCUMENTS 1 722431  3/1995  Japan .

*Primary Examiner*—Albert W. Paladini
*Attorney, Agent, or Firm*—Birch, Stewart, Kolasch & Birch, LLP

[57] ABSTRACT

A communication system for a vehicle, provided with a balanced cable connecting respective nodes and a comparator for obtaining a receive signal by differentially amplifying a signal from the balanced cable, for carrying out communication between respective nodes, being further provided with a unit for limiting signals input to each input terminal of the comparator to values in mutually different fixed ranges. This provides a vehicle communication system that has high reliability and is resistant to noise.

18 Claims, 6 Drawing Sheets

WHEN SIGNAL IS H LEVEL

WHEN SIGNAL IS L LEVEL

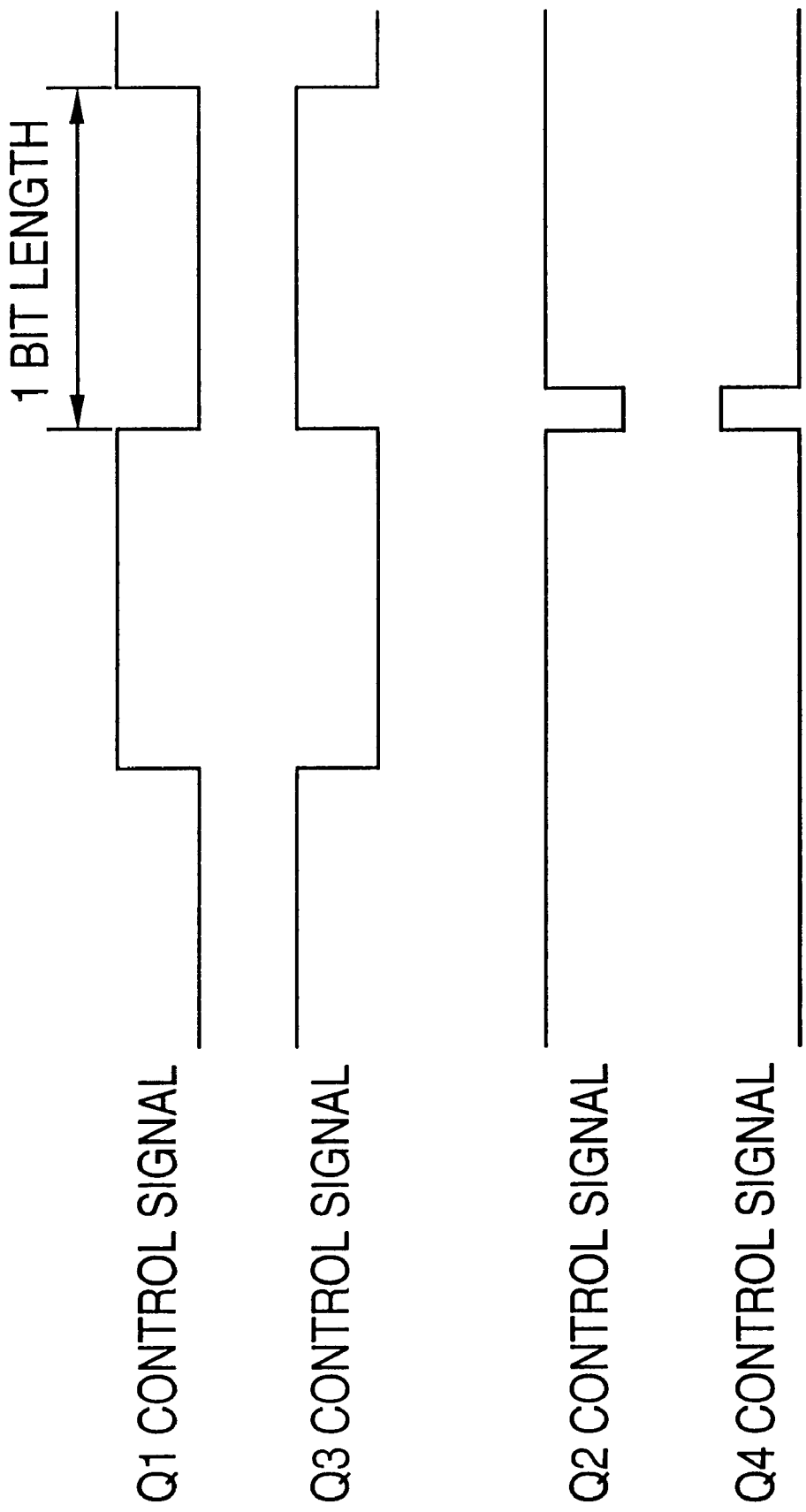

WHEN SIGNAL IS H LEVEL

WHEN SIGNAL IS L LEVEL

COMMUNICATION SYSTEM FOR VEHICLE

FIELD OF INVENTION

The present invention relates to a vehicle communication system for use in a motorcycle, car, or similar vehicle, and particularly to a vehicle communication system suitable for high speed communication with reduced pulse signal waveform distortion.

BACKGROUND OF THE INVENTION

Japanese Patent publication No. Hei 7-22431, discloses a mobile communication system in which various transceiver unit (node) sets are connected by single signal lines. Reduction in weight and cost, as well as improvement in communication efficiency, is made possible by simplifying the previous communication system construction.

A circuit diagram of a conventional vehicle communication system for carrying out communication between nodes is shown in FIG. 6. A balanced cable 5 is used as the signal line, which is a twisted pair cable. Node 16 has the same configuration as node 12.

Node 12 is equipped with a transmission circuit 121, a reception circuit 125, and a microcomputer 3. The microcomputer 3 outputs a transmission signal through an output terminal 3a, and this transmission signal acts as a control signal for simultaneously controlling both transistors Q1 and Q3. The reception circuit 125 is equipped with a comparator CP for outputting a reception signal to the input terminal 3b of the microcomputer 3, and resistors R1, R3.

The non-inverting input terminal of the comparator CP (+terminal) is connected to terminal 12a through resistor R1, while the inverting input terminal (−terminal) is connected to terminal 12b through resistor R3.

The transmission circuit 121 is equipped with transistors Q1 and Q3, an inverter N1, an inverter N3, diodes D1–D4, and pull-up resistors RL, RL. The inverter N1 generates a control signal for transistor Q1 by inverting the signal transmitted by the microcomputer 3 through the output terminal 3a. The inverter N3 generates a control signal for transistor Q3 by inverting the control signal output from inverter N1.

A power supply voltage Vdd is applied to the collector of transistor Q1 through a pull-up resistor RL, and the collector of transistor Q3 is connected to ground through a pull-up resistor RL. The core of one cable 5a of the balanced cable 5 is connected to the collector of the transistor Q1 through terminal 12a, while the core of the other cable 5b of the balanced cable 5 is connected to the collector of transistor Q3 through terminal 12b.

In node 12, when the microcomputer 3 sets the output terminal 3a to an H (high) level by transmitting an H level signal, the transistors Q1 and Q3 are both turned off. As a result, the potential of terminal 12a of node 12, the cable 5a that is connected to terminal 12a, and terminal 16a of node 16 connected to the cable 5a becomes the power supply voltage Vdd and has an H level signal. Further, the potential of terminal 12b of node 12, the cable 5b that is connected to terminal 12b and terminal 16b of node 16 connected to the cable 5b becomes the ground potential (0 volts) and has an L level signal.

If a signal is transmitted from node 16 via the balanced cable 5, the comparator CP of node 12 obtains a reception signal (H level signal) by differentially amplifying the signal from the balanced cable 5 and outputs an H level signal to the microcomputer 3.

On the other hand, if the output terminal 3a is set to an L (Low) level as a result of the microcomputer 3 transmitting an L level signal, transistors Q1 and Q3 are turned on together. As a result, the potential of terminal 12a of node 12, the cable 5a that is connected to terminal 12a, and terminal 16a of node 16 connected to the cable 5a becomes the ground potential (0 volts) and has an L level signal. Further, the potential of terminal 12b of node 12, the cable 5b connected to terminal 12b and terminal 16b of node 16 connected to the cable 5b becomes the power supply voltage Vdd and has an H level signal.

If a signal is transmitted from node 16 via the balanced cable 5, the comparator CP of node 12 obtains a reception signal (L level signal) by differentially amplifying the signal from the balanced cable 5 and outputs an L level signal to the microcomputer 3.

The comparator CP obtains a reception signal by differentially amplifying a signal from the balanced cable 5. When excessive noise beyond an H or L level input range, or common mode noise, gets into the balanced cable 5, the comparator CP can not obtain an accurate reception signal. This is because a difference input voltage of the comparator CP becomes 0 volts or is almost indiscernible, and the signal is destroyed.

Several approaches have been made to solve this problem, such as reducing noise on the signal line of the balanced cable, with a shield, or reducing noise by converting to an optical signal. However, they all suffer from major drawbacks, such as packaging and cost.

SUMMARY OF THE INVENTION

The present invention sets out to solve the above described problems of the related art, and has as its object to provide a communication system, for carrying out communication between respective nodes in a vehicle in which noise is severe. The embodiments of the present invention incorporate a balanced cable connecting respective nodes and a comparator for obtaining a receive signal by differentially amplifying a signal from the balanced cable.

A communication system is provided with an approach for limiting the signal input to each input terminal of the comparator to a value within mutually different fixed ranges.

It is possible to make the distortion of a signal small by limiting the signal input to respective input terminals of the comparator to a value in a specified range. By limiting the signal input to the comparator to values in mutually different fixed ranges, it is possible to set an input voltage range to a limit range suitable for the input terminal when an input range for each input terminal of the comparator is different.

In the communication system a unit may vary the fixed range at at least one input terminal side according to the output condition of the comparator. Therefore, it is possible to set a limit range suitable for each input terminal when the input voltage range is different.

When the output of the comparator is at an H level, an upper limit value of the fixed range at a non-inverting input terminal side is set larger than an upper limit value of the fixed range at an inverting terminal input side. Also a lower limit value of the fixed range at the non-inverting input terminal side is set between the upper limit value and a lower limit value of the fixed range at the inverting input terminal side. When noise in excess of the H/L level voltage value enters the balanced cable, it is possible to allow a differential input voltage between both input terminals to remain by setting the upper and lower limit values of the fixed range at the non-inverting input terminal side in this manner.

When the output of the comparator is at an L level, an upper limit value of the fixed range at a non-inverting input terminal side is set between an upper limit value and a lower limit value of the fixed range at an inverting input terminal side. Further, a lower limit value of the fixed range at the non-inverting input terminal side is set lower than a lower limit value of the fixed range at the inverting input terminal side. A differential voltage becomes the difference between an upper limit value and another value between the upper limit value and the lower limit value. Then in the event that noise in excess of the H level voltage value (rising noise) enters the balanced cable, the differential voltage is the voltage between both input terminals. The inverting input terminal becomes a voltage having the upper limit value, and the non-inverting input terminal becomes a voltage having a value between the upper limit value and the lower limit value.

By setting a lower limit value of the fixed range at the non-inverting input terminal side lower than a lower limit value of the fixed range at the inverting input terminal side, then in the event that noise in excess of the L level voltage (falling noise) value enters the balanced cable, it is possible to prevent at least inversion of the polarity of the input voltage at both input terminals by making the inverting input terminal a voltage having the lower limit value, and also by making the non-inverting input terminal a voltage having the same lower limit value.

Another preferred embodiment of the present invention includes the following features. A non-inverting input terminal of the comparator and one wire of the balance cable are connected through a reference resistor (R1). An inverting input terminal of the comparator and the other wire of the balance cable are connected through a resistor (R3) having the same resistance value as the reference resistor (R1). The inverting input terminal of the comparator and a power supply voltage terminal are connected through a resistor (R5) having a resistance value twice that of reference resistor (R1). The inverting input terminal of the comparator is earthed through a resistor (R4) having a resistance value twice that of reference resistor (R1). An output terminal of the comparator and the non-inverting input terminal of the comparator are connected through a resistor (R2) having the same resistance value as the reference resistor (R1). In addition, the output terminal of the comparator and the power supply voltage terminal are connected through a resistor (R0) having a lower resistance value than reference resistor (R1).

If the comparator outputs an H level signal, the non-inverting input terminal (+terminal) is at the comparator power supply voltage Vdd and the inverting input terminal (−terminal) is about (¼) Vdd, noise may enter the balanced cable and the end of the balanced cable momentarily becomes Vdd. It is possible to divide this Vdd by ½ using resistor R3 and resistors R4, R5 and to limit the rising of the input voltage of the inverting input terminal (−terminal) to about (¾) Vdd. Further, the input voltage of the non-inverting input terminal (+terminal) can be kept at Vdd.

When noise enters the balanced cable and the end of the balanced cable momentarily drops to 0 (volts), the lowering of the input voltage of the non-inverting input terminal (+terminal) can be limited to about (½) Vdd by dividing with resistors R1 and R2. Meanwhile, the input voltage of the inverting input terminal (−terminal) can be kept at about (¼) Vdd.

If the comparator outputs an L level signal, the non-inverting input terminal (+terminal) is at 0 (volts) and the inverting input terminal (terminal) is about (¾) Vdd, noise may enter the balanced cable and the end of the balanced cable momentarily becomes Vdd. It is possible to divide this Vdd by ½ using resistor R1 and resistors R2, to limit the rising of the input voltage of the non-inverting input terminal (+terminal) to about (½) Vdd. Meanwhile, the input voltage of the inverting input terminal (−terminal) can be kept at about (¾) Vdd.

When noise enters the balanced cable and the end of the balanced cable momentarily becomes 0 (volts), the lowering of the input voltage of the inverting input terminal (−terminal) can be limited to about (¼) Vdd by dividing using resistor R5 and resistors R3 and R4. In addition, the input voltage of the non-inverting input terminal (+terminal) can be kept at 0 (volts).

Accordingly, signals input to each of the comparator input terminals can be limited to values in mutually different fixed ranges, and a fixed range at the side of at least one input terminal can be made to vary according to the output condition of the comparator.

Further, in the case where the comparator output is an H level signal, it is possible to set an upper limit value of the fixed range at a non-inverting input terminal side larger than an upper limit value of the fixed range at an inverting terminal input side. A lower limit value of the fixed range at the non-inverting input terminal side can be set between the upper limit value and a lower limit value of the fixed range at the inverting input terminal side. If the comparator output is an L level signal, it is possible to set the upper limit value of the fixed range at a non-inverting input terminal side between an upper limit value and a lower limit value of the fixed range at an inverting input terminal side. Further, the lower limit value of the fixed range at a non-inverting input terminal side can be set to a value that is smaller than the lower limit value of the fixed range at the inverting input terminal side.

Yet another preferred embodiment of the present invention includes the following features. A non-inverting input terminal of the comparator and one cable of the balanced cable are connected through a reference resistor (R1). An inverting input terminal of the comparator and the other cable of the balance cable are connected through a resistor (R3) having about the same resistance value as the reference resistor (R1). The inverting input terminal of the comparator is earthed through a resistor (R41) having a resistance value about three times that of reference resistor (R1). An output terminal of the comparator and the non-inverting input terminal of the comparator are connected through a resistor (R21) having a resistance value about twice that of the reference resistor (R1). Also in this embodiment, the output terminal of the comparator and the power supply voltage terminal are connected through a resistor (R01) having about the same resistance value as reference resistor (R1).

If the comparator outputs an H level signal, the non-inverting input terminal (+terminal) is at Vdd and the inverting input terminal (−terminal) is at 0 (volts), noise may enter the balanced cable and terminals 2a and 2b momentarily become Vdd. This Vdd can be divided to about ¾ using resistor R3 and resistor R4, and the rising of the input voltage of the inverting input terminal (−terminal) can be limited to about (¾) Vdd. Also, the input voltage of the non-inverting input terminal (+terminal) can be kept at Vdd.

When noise enters the balanced cable and terminals 2a and 2b momentarily drop to the earth voltage 0 (volts), the falling of the input voltage of the non-inverting input terminal (+terminal) can be limited to about (¼) Vdd by dividing using resistors R0, R1 and R2. Meanwhile, the input voltage of the inverting input terminal (−terminal) can be kept at 0 (volts).

If the comparator outputs an L level, the non-inverting input terminal (+terminal) is at 0 (volts) and the inverting input terminal (terminal) is at about (¾) Vdd, noise may enter the balanced cable and terminals 2a and 2b momentarily become Vdd. This Vdd can be divided to ⅔ using resistor R1 and resistor R2, and the rising of the input voltage of the non-inverting input terminal (+terminal) can be limited to about (⅔) Vdd. The input voltage of the inverting input terminal (−terminal) can be kept at about (¾) Vdd by dividing Vdd using resistor R3 and resistor R4.

When noise enters the balanced cable and terminals 2a and 2b momentarily become 0 (volts), the falling of the input voltage at the inverting input terminal (−terminal) can be limited to 0 (volts). In addition, the input voltage of the non-inverting input terminal (+terminal) can be kept at 0 (volts).

Accordingly, signals input to each of the comparator input terminals can be limited to values in mutually different fixed ranges, and a fixed range at the side of at least one input terminal can be made to vary according to the output condition of the comparator.

Further, in the case where the comparator output is an H level signal, it is possible to set an upper limit value of the fixed range at a non-inverting input terminal side larger than an upper limit value of the fixed range at an inverting terminal input side. A lower limit value of the fixed range at the non-inverting input terminal side can be set between the upper limit value and a lower limit value of the fixed range at the inverting input terminal side.

If the comparator output is an L level it is possible to set the upper limit value of the fixed range at a non-inverting input terminal side between an upper limit value and a lower limit value of the fixed range at an inverting input terminal side. The lower limit value of the fixed range at a non-inverting input terminal side can be set to a value that does not exceed the lower limit value of the fixed range at the inverting input terminal side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2[B] is a diagram illustrating fluctuation in input terminal voltage of the comparator caused by noise when the comparator is receiving an L level signal;

FIG. 3 is a timing chart of each of the control signals for transistors Q1–Q4;

FIG. 5[B] is a diagram illustrating fluctuations in input terminal voltage of the comparator caused by noise when the signal is L level.

DETAILED DESCRIPTION OF THE INVENTION

Figure 1:
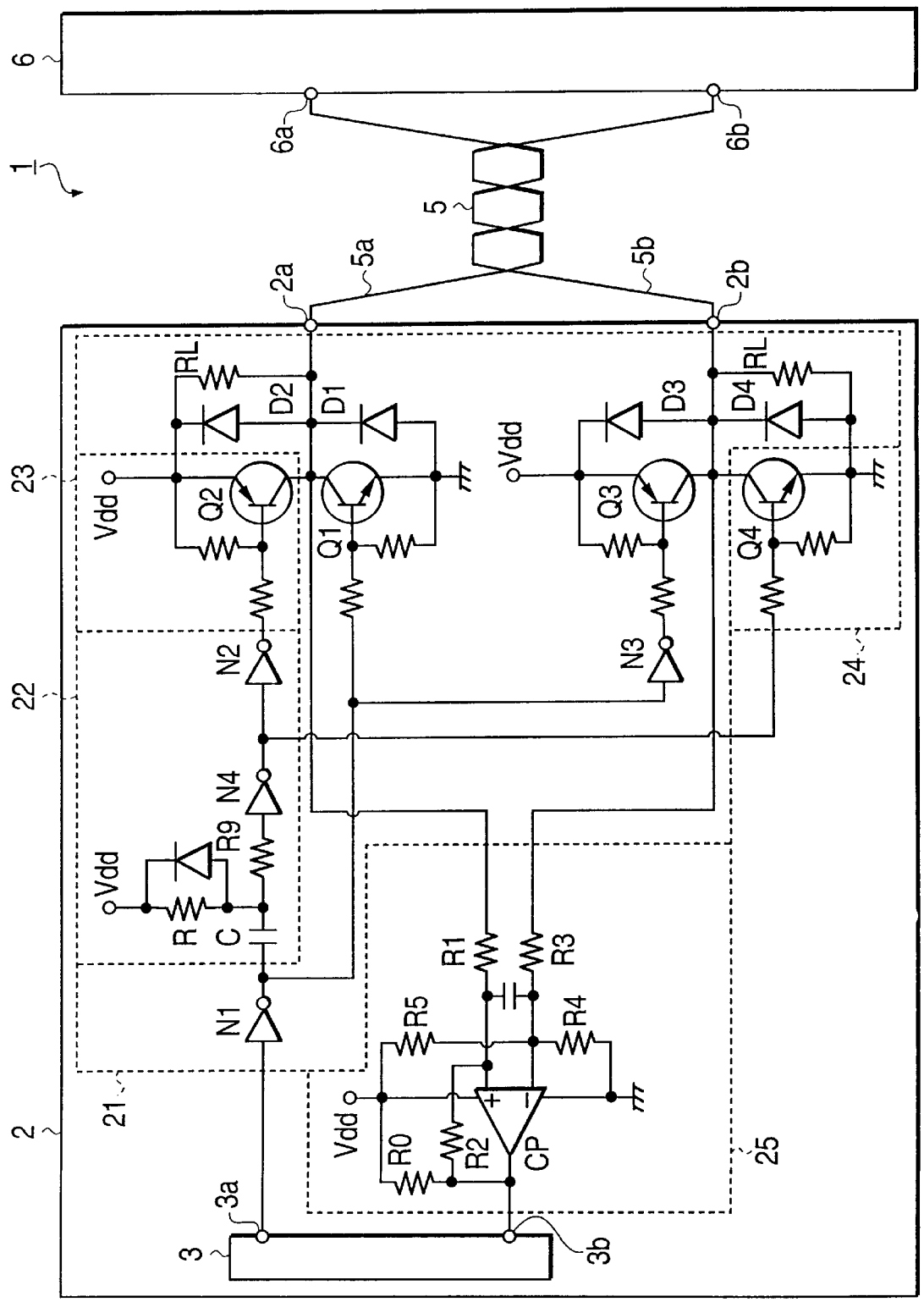
FIG. 1 is a circuit diagram of a vehicle communication system of the present invention.

The exemplary embodiments of the invention claimed in the appended claims may be more fully appreciated by reference to the following description of preferred embodiments. Within the drawing figures, it should be understood that like elements are identified by like reference numbers.

FIG. 1 is a circuit diagram of a vehicle communication system of the present invention.

A balanced cable 5 is used as a signal line, namely a twisted pair cable. Node 6 has the same configuration as node 2, and terminals 6a and 6b correspond to terminals 2a and 2b, and are connected through the balanced cable 5. The vehicle communication system 1 carries out communication between nodes via the balanced cable 5.

Node 2 is provided with a transmission circuit 21, a trigger pulse generating circuit 22, charge and discharge units 23, 24, a reception circuit 25 and a microcomputer 3. A controller, such as the microcomputer 3 outputs a transmission signal through the output terminal 3a, and this transmission signal is used simultaneously as a control signal for controlling both transistors Q1 and Q3. The transmission circuit 21 is provided with transistors Q1 and Q3, an inverter N1, an inverter N3, diodes D1–D4, and pull-up resistors RL, RL. The inverter N1 generates a control signal for transistor Q1 by inverting a signal that the microcomputer 3 has transmitted through output terminal 3a. The inverter N3 generates a control signal for transistor Q3 by inverting the first control signal.

The power supply voltage Vdd is applied to the collector of transistor Q1 through a pull-up resistor RL, and the collector of transistor Q3 is connected to earth through a pull-up resistor RL. The collector of transistor Q1 is connected to one wire 5a of the balanced cable 5 via terminal 2a, and the collector of transistor Q3 is connected to the other wire 5b of the balanced cable 5 via terminal 2b.

With respect to node 2, if output terminal 3a is set to an H (high) level by the microcomputer 3 transmitting an H level signal, transistor Q1 and transistor Q3 are both turned off. As a result, the potential of terminal 2a of node 2, the wire 5a that is connected to terminal 2a, and the terminal 6a of node 6 connected to the wire 5a becomes high, namely the power supply potential Vdd. In addition, the potential of terminal 2b of node 2, the wire 5b that is connected to terminal 2b, and the terminal 6b of node 6 connected to the wire 5b becomes low, namely the earth potential (volts).

If a signal is transmitted from node 6 via the balanced cable 5, the comparator CP inside the reception circuit 25 of node 2 obtains a reception signal (H level signal) by differentially amplifying the signal from the balanced cable 5 and outputs an H level to the microcomputer 3. On the other hand, if the output terminal 3a is set to an L (Low) level as a result of the microcomputer 3 transmitting an L level signal, transistors Q1 and Q3 are turned on together. As a result, the potential of terminal 2a of node 2, the cable 5a connected to terminal 2a and terminal 6a of node 6 connected to the cable 5a becomes low, the ground potential (0 volts). The potential of terminal 2b of node 2, the cable 5b connected to terminal 2b and terminal 6b of node 6 connected to the cable 5b becomes the power supply voltage Vdd and are at an H level.

If a signal is transmitted from node 6 via the balanced cable 5 a comparator CP of node 2 obtains a reception signal (L level signal) by differentially amplifying the signal from the balanced cable 5. The comparator CP then outputs an L level to the microcomputer 3.

The reception circuit 25 is provided with resistors R0–R5, a capacitor, and the comparator CP for outputting the reception signal to the input terminal 3b of the microcomputer 3. The inverting input terminal (−terminal) and non-inverting input terminal (+terminal) of the comparator CP are connected through a capacitor to eliminate noise.

The non-inverting input terminal (+terminal) of the comparator CP and the wire 5a are connected through terminal 2a and resistor R1. The inverting input terminal (−terminal) and the wire 5b are connected through the terminal 2b and the resistor R3. The resistance values of resistor R1 and resistor R3 are the same.

The inverting input terminal (−terminal) of the comparator CP is connected to the supply terminal for the power supply voltage Vdd through a resistor R5 having a resistance value twice that of resistor R1. The inverting input terminal is also connected to earth through a resistor R4 also having a resistance value twice that of resistor R1. Here, the expression "twice" includes the general meaning of approximately twice.

The non-inverting input terminal (+terminal) and the output terminal of the comparator CP are connected through a resistor R2 having the same (which includes approximately the same) resistance value as resistor R1. The output terminal of the comparator CP and the supply terminal of the power supply voltage Vdd are connected.

The output terminal of the comparator CP and the supply terminal of the power supply voltage Vdd are connected through a resistor R0 acting as an open collector. Resistor R0 has a resistance value much smaller than that of resistor R1.

Equations representing the relationship between the resistance values can be expressed, for example, as follows:

R0<<R1, R3=R1, R2=R1, R4=2×R1, R5=2×R1.

For example, R0=1kΩ, R1=R2=R3=24kΩ, R4=R5=47kΩ.

Even if noise exceeding Vdd enters the balanced cable 5, the noise can be clipped to Vdd by diodes D2 and D3. If the potential of terminals 2a and 2b fluctuates, the noise can be limited to a maximum of Vdd.

If noise below the earth potential of 0 (volts) enters the balanced cable 5, the noise can be clipped to 0 (volts) by diodes D1 and D4. If the potential of terminals 2a and 2b fluctuates, it can be limited to a minimum of 0 (volts).

Figure 2A:
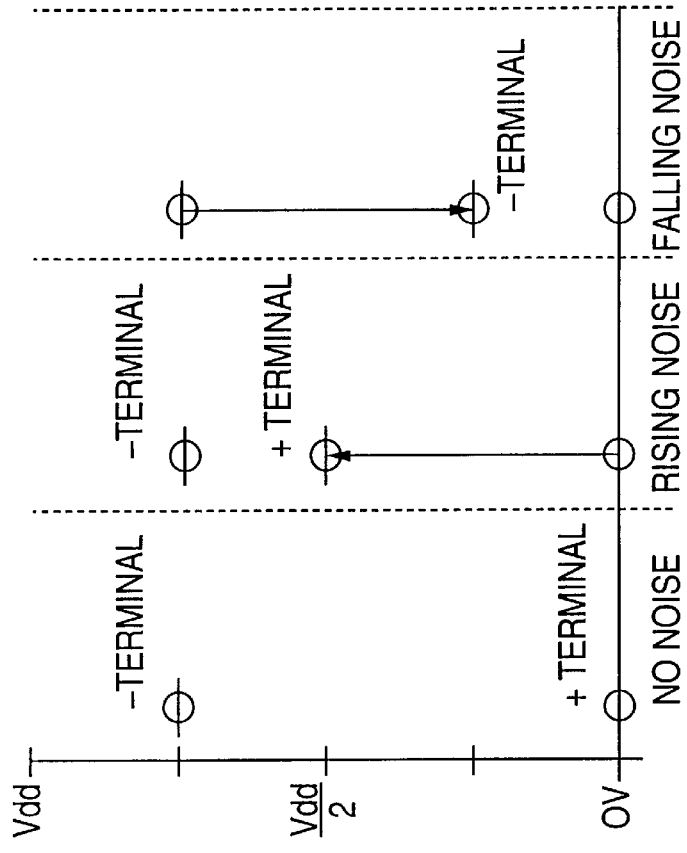
FIG. 2[A] is a diagram illustrating fluctuations in input terminal voltage of the comparator caused by noise when the comparator is receiving an H level signal.
Figure 2B:
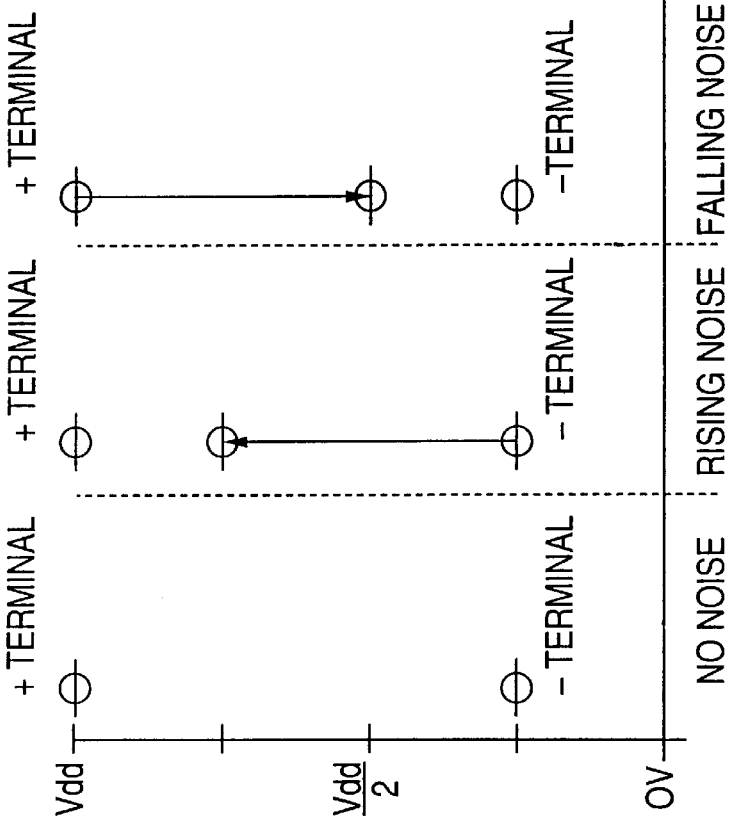

FIG. 2 is a drawing illustrating fluctuations in the input terminal potential of the comparator CP caused by noise. FIG. 2 [A] shows a case when the comparator CP is receiving an H level signal, and FIG. 2 [B] shows a case when the comparator CP is receiving (output) an L level signal.

The comparator CP receives an H level signal. If the non-inverting input terminal (+terminal) is at Vdd and the inverting input terminal (−terminal) is about (¼) Vdd, then when noise enters the balanced cable 5, the terminals 2a and 2b momentarily become Vdd. It is possible to divide this Vdd by ½ using resistor R3 and resistors R4, R5 (R4//R5). It is also possible to limit the rising of the input voltage of the inverting input terminal (−terminal) to about (¾) Vdd. The input voltage of the non-inverting input terminal (+terminal) can be kept at Vdd.

When noise enters the balanced cable 5 and the terminals 2a and 2b momentarily become 0 (volts), the lowering of the input voltage of the non-inverting input terminal (+terminal) can be limited to about (½) Vdd by dividing using resistors R1 and R2. Similarly, the input voltage of the inverting input terminal (−terminal) can be kept at about (¼) Vdd by dividing Vdd using resistor R4 and resistors R4, R3 (R4//R3).

The comparator CP receives an L level signal. If the non-inverting input terminal (+terminal) is at 0 (volts) and the inverting input terminal (terminal) is about (¾) Vdd, then when noise enters the balanced cable 5, the terminals 2a and 2b momentarily become Vdd. It is possible to divide this Vdd by ½ using resistor R1 and resistors R2, and it is possible to limit the rising of the input voltage of the non-inverting input terminal (+terminal) to about (½) Vdd. The input voltage of the inverting input terminal (−terminal) can also be kept at about (¾) Vdd.

When noise enters the balanced cable 5 and the terminals 2a and 2b momentarily become 0 (volts), the lowering of the input voltage of the inverting input terminal (−terminal) can be limited to about (¼) Vdd by dividing using resistor R5 and resistors R4 and R3 (R4 //R3). Further, the input voltage of the non-inverting input terminal (+terminal) can be kept at about 0 (volts).

Accordingly, signals input to each input terminal of the comparator CP can be limited to values in mutually different fixed ranges, and a fixed range at the side of at least one input terminal can be made to vary according to the output condition of the comparator.

Further, if the comparator CP output is an H level signal, it is possible to set an upper limit value of the fixed range at a non-inverting input terminal side larger than an upper limit value of the fixed range at an inverting terminal input side. A lower limit value of the fixed range at the non-inverting input terminal side can also be set between the upper limit and lower limit value of the fixed range at the inverting input terminal side.

If the comparator output is an L level signal, it is possible to set the upper limit value of the fixed range at a non-inverting input terminal side between an upper and lower limit value of the fixed range at an inverting input terminal side. The lower limit value of the fixed range at the non-inverting input terminal side can also be set to a value that is smaller than the lower limit value of the fixed range at the inverting input terminal side.

Further, it is possible to have such a structure that a previous level value of another signal is about ⅔ of the difference between an H and L level signal input to the comparator CP when there is no noise.

The potential of the non-inverting input terminal (+terminal) when the 11 comparator CP is ON, and the potential of the inverting input terminal (−terminal) when the comparator CP is OFF are different, and clipping level values are respectively set accordingly. Similarly, the potential of the non-inverting input terminal (+terminal) when the comparator CP is OFF, and the potential of the inverting input terminal (−terminal) when the comparator CP is ON are also different, and clipping level values are respectively set accordingly.

The charge and discharge units 23 and 24 are respectively provided with transistors Q2 and Q4, bias resistors connected across the base and emitter of these transistors Q2 and Q4, and base resistors connected to the bases.

Terminal 2a is connected to the collector of transistor Q2 constituting a switching element, and the power supply voltage Vdd is applied to the emitter. This switching element is connected in parallel with a pull-up resistor RL.

Terminal 2b is connected to the collector of transistor Q4 constituting a switching element. The emitter is connected to earth, and this switching element is connected in parallel with a pull-up resistor RL.

The charge unit 23 allows for charging the distributed capacitance of the wire 5a of the balanced cable 5 by making a charge by-pass pull-up resistor RL such that the signal wave shape distortion is small. It is also possible to speed up the rise time of a signal compared to the previously discussed case where the distributed capacitance of the balanced cable 5 is charged up by by-passing a pull-up resistor RL.

The discharge unit 24 allows for discharging the distributed capacitance of the wire 5b of the balanced cable 5 by making a stored charge by-pass pull-up resistor RL and the signal wave shape can be made small. It is also possible to speed up the fall time of a signal compared to the previously discussed case where the distributed capacitance of the balanced cable 5 is charged up by making a charge by-pass a pull-up resistor RL.

The control signal for transistors Q2 and Q4 is provided by a trigger pulse generated from the control signal of transistor Q1. FIG. 3, shows a timing chart of each of the control signals for transistors Q1–Q4.

As shown in FIG. 1, by transmitting an H/L level signal from the output terminal 3a of the microcomputer 3 the control signal for transistor Q1 is generated through inverter N1, and the control signal for transistor Q3 is produced by inverting this control signal using inverter N3.

The control signal for transistor Q4 is generated from the control signal for transistor Q1 after it has passed through a differentiating circuit comprised of capacitor C and resistor R9, and a wave shaping circuit comprised of the inverter N4. The control signal for transistor Q2 is generated by inverting this control signal using inverter N2.

When the control signal of transistor Q1 stays at an L level, the control signal of transistor Q3 stays at an H level, and transistors Q1–Q4 are all off. The wire 5a connected to terminal 2a is at an H level, and the wire 5b connected to terminal 2b is at an L level.

The signal transmitted by the microcomputer 3 via the output terminal 3a is switched at a length that is an integer number of times a single bit length.

If the control signal of transistor Q1 is switched to an H level, transistors Q1 and Q3 are turned on, while transistors Q2 and Q4 remain off. The wire 5a connected to terminal 2a becomes an L level, and the wire 5b connected to terminal 2b becomes an H level.

If the control signal of transistor Q1 is switched to an L level, transistors Q1 and Q3 are turned off. Transistors Q2 and Q4 are turned on simultaneously, but are turned off quickly within the time of 1 bit length.

Namely, the circuit structure is such that the control signal for transistors Q1 and Q2 are switched from an H level to an L level. Since the power supply voltage Vdd is applied to one end of the capacitor C through resistor R and the capacitor is charged according to the time constant determined by this C and R, the control signal of transistor Q2 is switched from an L level to an H level in a short time, and a trigger pulse is generated.

The trigger pulse generating circuit 22 is provided with resistors R and R9, a diode having the power supply voltage Vdd on the cathode and being connected in parallel with the resistor R, a capacitor C having one end connected to an output terminal of inverter N1 and another end supplied with the power supply voltage Vdd through resistor R, an inverter N4 connected to the other end of the capacitor through resistor R9, and an inverter N2. The pulse width of the trigger pulse is made shorter to less than 1 bit length by adjusting the time constant determined by C and R.

As a result, transistor Q2 is on for only a fixed period of time (the time of the pulse width of the trigger pulse) which is shorter than a 1 bit length of a signal from the time when transistor Q1 is switched from on to off. Further, the distributed capacitance of the wire 5a is charged up by making a charge by-pass pull-up resistor RL.

The operation of transistors Q3 and Q4, is the same as the operation of transistors Q1 and Q2 described above. However, transistor Q2 charges up the distributed capacitance of the wire 5a by making a charge by-pass the pull-up resistor RL, but transistor Q4 charges up the distributed capacitance of wire 5b by making a charge by-pass pull-up resistor RL.

Figure 4:
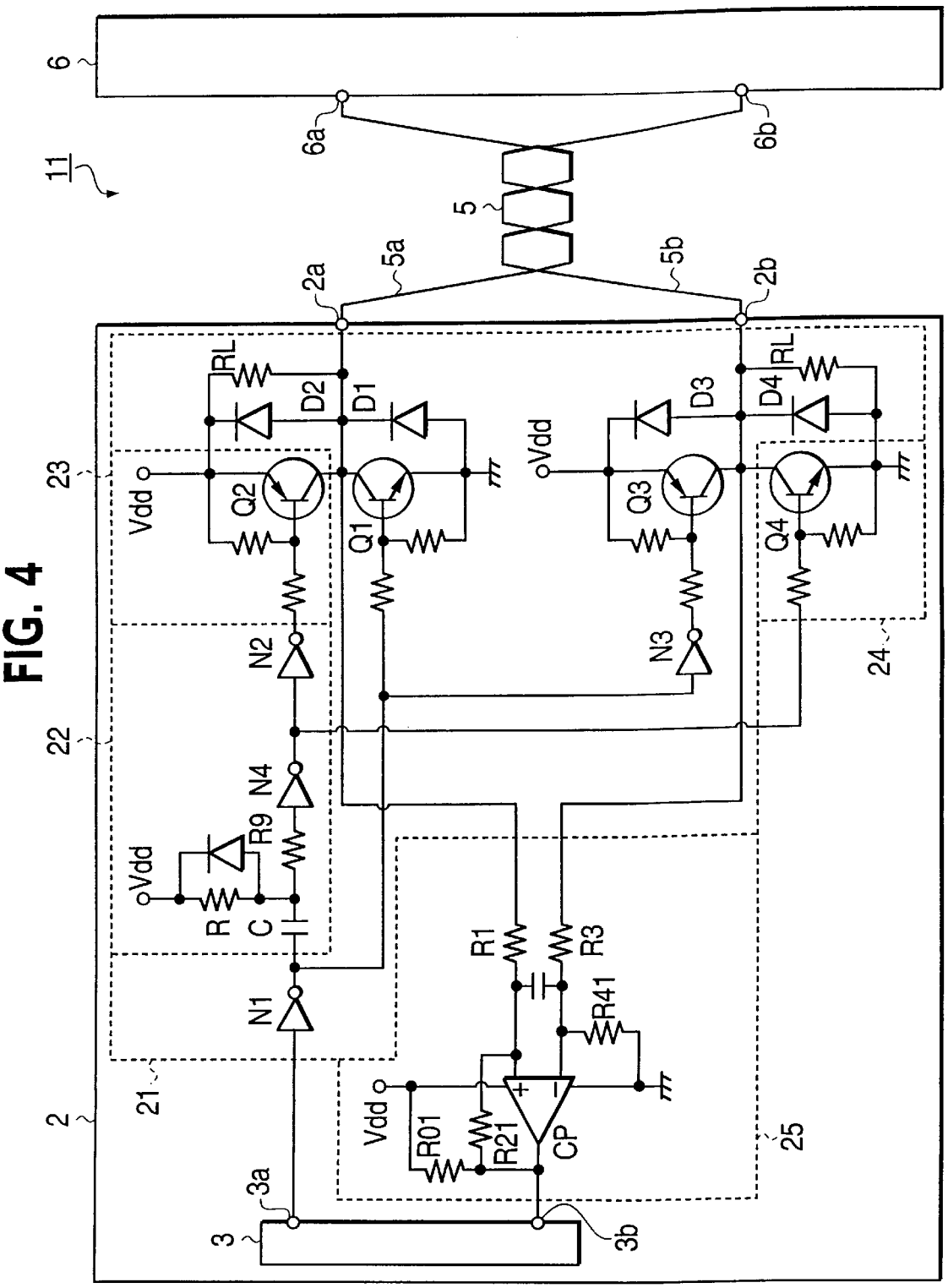
FIG. 4 is a is a circuit diagram of a vehicle communication system of the present invention.

FIG. 4 shows a circuit diagram of another embodiment of a vehicle communication system of the present invention.

The reception circuit 25 of FIG. 4 is provided with resistors R1, R3, R01, R21 and R41, a capacitor and a comparator CP for outputting a receive signal to an input terminal 3b of the microcomputer 3. The circuit is the same as the reception circuit 25 in FIG. 1, except that the reception circuit 25 in FIG. 1 includes a resistor R5.

The transmission circuit 21, trigger pulse generating circuit 22, and charge and discharge units 23 and 24 are the same as in the circuit of FIG. 1, and the description thereof will be omitted.

The resistance value of resistor R01 is about the same as the resistance value of resistor R1. The resistance value of resistor R21 is about twice the resistance value of resistor R1. The resistance value of resistor R41 is about three times the resistance value of resistor R1. Actual values for each of the resistors in FIG. 4, can be set, for example, as follows.

$$R01=R1=R3=1.2k\Omega,\ R21=2.7k\Omega,\ R41=3.9k\Omega.$$

Figure 5A:
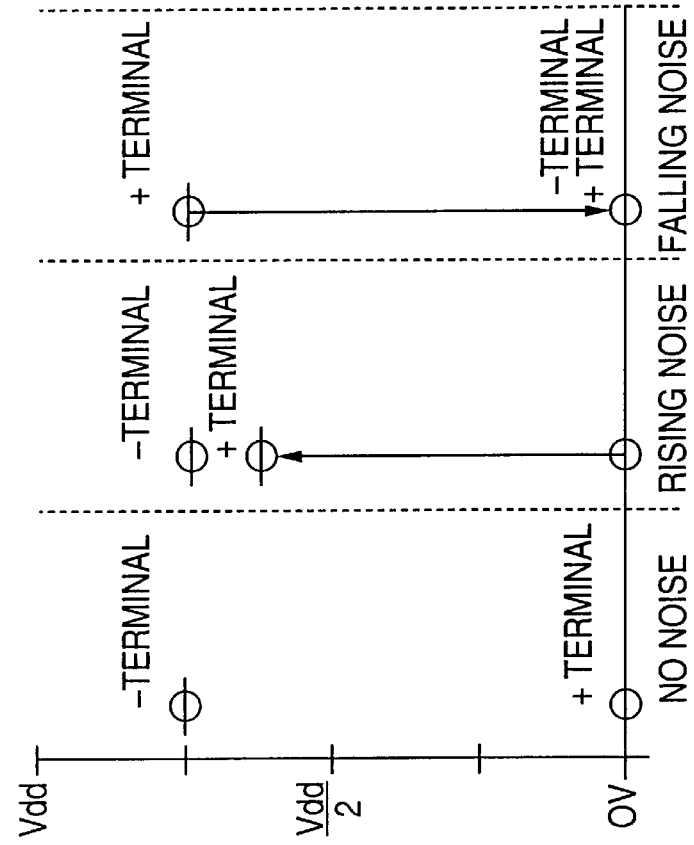
FIG. 5[A] is a diagram illustrating fluctuations in input terminal voltage of the comparator caused by noise when the signal is H level.
Figure 5B:
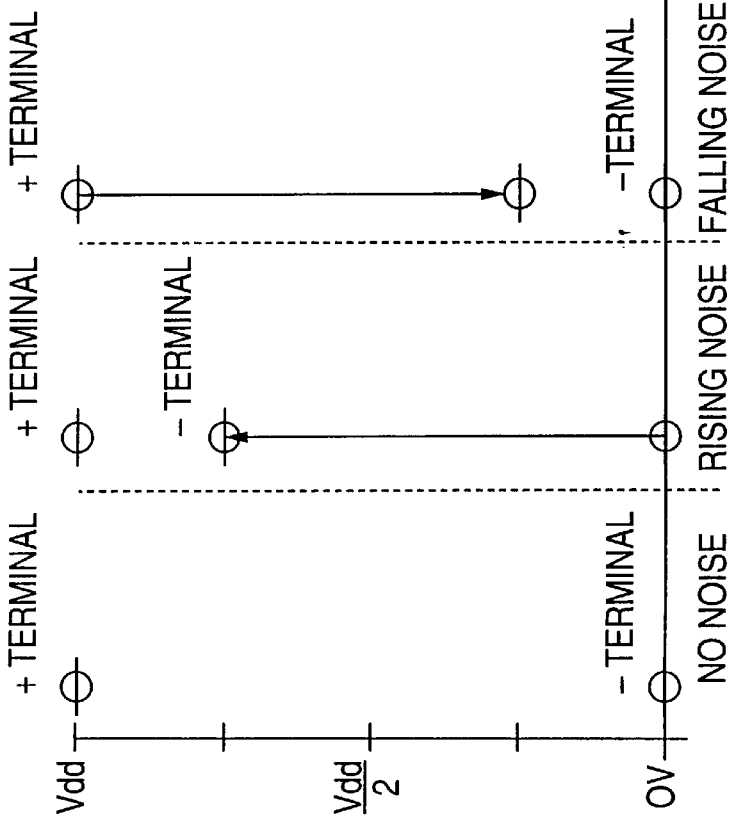
Figure 6:
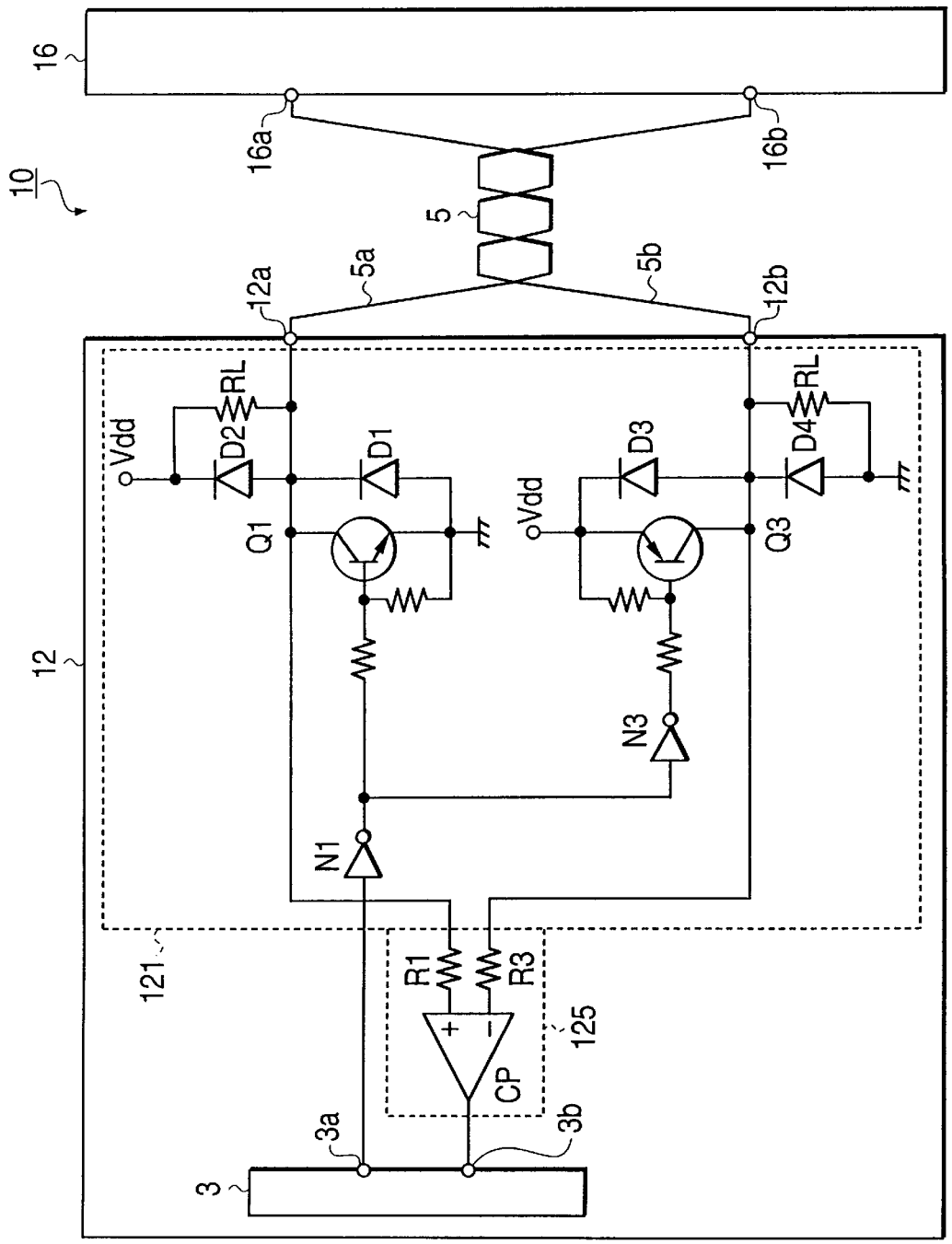
FIG. 6 is a circuit diagram of a vehicle communication system of the related art.

FIG. 5 is a drawing for explaining fluctuations in the input terminal voltage of the comparator CP caused by noise, for the vehicle communication system shown in FIG. 4. FIG. 5 [A] is for the case where the comparator is receiving (outputting) an H level signal, and FIG. 5 [B] is for the case where the comparator is receiving (outputting) an L level signal.

If the comparator CP receives or outputs an H level signal, the non-inverting input terminal (+terminal) is at Vdd and the inverting input terminal (−terminal) is at 0 (volts), then noise can enter the balanced cable 5 and terminals 2a and 2b momentarily become Vdd. This Vdd can be divided to about ¾ using resistor R3 and resistor R4, and the rising of the input voltage of the inverting input terminal (−terminal) can be limited to about (¾) Vdd. The input voltage of the non-inverting input terminal (+terminal) can be kept at Vdd.

When noise enters the balanced cable 5 and terminals 2a and 2b momentarily become the earth voltage 0 (volts), the falling of the input voltage of the non-inverting input terminal (+terminal) can be limited to about (¼) Vdd by dividing using resistors R0, R1 and R2. The input voltage of the inverting input terminal (−terminal) can be kept at 0 (volts).

If the comparator CP receives or outputs an L level, the non-inverting input terminal (+terminal) is at 0 (volts) and the inverting input terminal (−terminal) is at about (¾) Vdd, then noise may enter the balanced cable 5 and terminals 2a and 2b momentarily become Vdd. This Vdd can be divided to about ⅔ using resistor R1 and resistor R2, and the rising of the input voltage of the non-inverting input terminal (+terminal) can be limited to about (⅔) Vdd. The input voltage of the inverting input terminal (−terminal) can be kept at about (¾) Vdd by dividing Vdd using resistor R3 and resistor R4.

When noise enters the balanced cable 5 and terminals 2a end 2b momentarily become 0 (volts), the falling of the input voltage of the inverting input terminal (−terminal) can be limited to 0 (volts). The input voltage of the non-inverting input terminal (+terminal) can be kept at 0 (volts).

Accordingly, signals input to each of the comparator CP input terminals can be limited to values in mutually different fixed ranges, and a fixed range at the side of at least one input terminal can be made to vary according to the output condition of the comparator CP.

Further, if the comparator CP output is an H level, it is possible to set an upper limit value of the fixed range at a non-inverting input terminal side larger than an upper limit value of the fixed range at an inverting terminal input side. A lower limit value of the fixed range at the non-inverting input terminal side can be set between the upper and lower limit values of the fixed range at the inverting input terminal side.

When the comparator output is an L level signal, it is possible to set the upper limit value of the fixed range at a non-inverting input terminal side between upper and lower limit values of the fixed range at an inverting input terminal side. The lower limit value of the fixed range at a non-inverting input terminal side may be set to a value that does not exceed the lower limit value of the fixed range at the inverting input terminal side.

It is possible to have a configuration where node 2 only carries out reception and node 6 only carries out transmission. The balanced cable 5 is preferable a twisted pair cable, but may also be a single pair wire (pair line, parallel line). Vdd is preferably applied to the emitter of transistor Q2 through a resistor having a resistance value much smaller than that of the pull-up resistor RL. The power supply voltage Vdd is preferably, for example, 5V. The comparator CP is preferably a hysteresis comparator.

As discussed above, according to a vehicle communication system of a preferred embodiment of the present invention, input signal distortion can be reduced by limiting a signal input to each input terminal of a comparator to a value in a fixed range. Further, by limiting the signal input to each input terminal of the comparator to values in mutually different fixed ranges, when an input range for each input terminal of the comparator is different, it is possible to set an input voltage range to a limit range suitable for the input terminal.

When the input voltage range is different for each input terminal of the comparator, it is possible to set a limit range suitable for each input terminal depending on the output condition of the comparator by varying the fixed range of at least one input terminal side according to the output condition of the comparator.

When a comparator output is an H level, it is possible to allow a differential input voltage between both input terminals to remain even when noise in excess of the H/L level voltage value enters the balanced cable. Therefore, it is possible to obtain an original reception signal from the comparator.

Further, when the comparator outputs an L level signal, it is possible to keep a differential input voltage across both input terminals about even when noise in excess of an H level voltage (rising noise) enters the balanced cable. Accordingly, it is possible to obtain an original reception signal from the comparator.

Still further, even in the event that noise in excess of the L level voltage value (falling noise) enters the balanced cable, it is possible to prevent at least inversion of the polarity of the input voltage at both input terminals.

Yet further, when the output of the comparator is an L level signal, even in the event that noise in excess of the L level voltage (falling noise) value enters the balanced cable, it is possible to allow a differential voltage between both input terminals to remain. Thus, it is possible to obtain an original reception signal from the comparator.

As previously discussed regarding another preferred embodiment of the invention, signals input to each of the comparator input terminals can be limited to values in mutually different fixed ranges, and a fixed range at the side of at least one input terminal can be made to vary according to the output condition of the comparator.

Further, in the case where the comparator output is an H level signal, it is possible to set an upper limit value of the fixed range at a non-inverting input terminal side larger than an upper limit value of the fixed range at an inverting terminal input side. A lower limit value of the fixed range at the non-inverting input terminal side can also be set between the upper and lower limit values of the fixed range at the inverting input terminal side.

If the comparator output is an L level signal, it is possible to set the upper limit value of the fixed range at a non-inverting input terminal side between upper and lower limit values of the fixed range at an inverting input terminal side. The lower limit value of the fixed range at a non-inverting input terminal side can also be set to a value that is smaller than the lower limit value of the fixed range at the inverting input terminal side.

As discussed above regarding yet another embodiment of the present invention, signals input to each of the comparator input terminals can be limited to values in mutually different fixed ranges, and a fixed range at the side of at least one input terminal can be made to vary according to the output condition of the comparator.

If the comparator output is an H level signal, it is possible to set an upper limit value of the fixed range at a non-inverting input terminal side larger than an upper limit value of the fixed range at an inverting terminal input side. A lower limit value of the fixed range at the non-inverting input terminal side can also be set between the upper and lower limit values of the fixed range at the inverting input terminal side.

If the comparator output is an L level signal, it is possible to set the upper limit value of the fixed range at a non-inverting input terminal side between upper and lower limit values of the fixed range at an inverting input terminal side. The lower limit value of the fixed range at a non-inverting input terminal side can also be set to a value that does not exceed the lower limit value of the fixed range at the inverting input terminal side.

According to the present invention as described above, it is therefore possible to provide a vehicle communication system having high reliability and being resistant to noise.

It should be apparent from the aforementioned description and attached drawings that the concept of the present application may be readily applied to a variety of preferred embodiments including those disclosed herein. Accordingly, the scope of the invention described in the instant application should be limited solely by the appended claims.

What is claimed:

1. A communication system for a vehicle, comprising:

a transceiver having a reception circuit and a transmission circuit;

a balanced cable having a plurality of wires for connecting the transceiver to another transceiver;

a comparator at the reception circuit having a first input terminal and a second input terminal for obtaining a receive signal by differentially amplifying a signal from the balanced cable; and a restrictive unit operatively connected to the comparator for limiting signals input to each of the input terminals of the comparator to values in mutually different fixed ranges.

2. The communication system of claim 1, wherein the restrictive unit varies the fixed range at least at one said input terminal according to an output condition of the comparator.

3. The communication system of claim 2, wherein when the comparator has an H level output, an upper limit value of the fixed range at the first input terminal is set larger than an upper limit value of the fixed range at the second input terminal, and a lower limit value of the fixed range at the first input terminal is set between the upper limit value and a lower limit value of the fixed range at the second input terminal.

4. The communication system of claim 3, wherein when the comparator has an L level output, the upper limit value of the fixed range at the first input terminal is set between the upper limit value and the lower limit value of the fixed range at the second input terminal, and the lower limit value of the fixed range at the first input terminal is set lower than the lower limit value of the fixed range at the second input terminal.

5. The communication system of claim 1, wherein the first input terminal of the comparator and one wire of the balance cable are connected having a first electrical resistance therebetween, and the second input terminal of the comparator and another wire of the balance cable are connected having a second electrical resistance therebetween substantially equal to the first electrical resistance.

6. The communication system of claim 5, wherein the second input terminal of the comparator and a power supply voltage terminal are connected having a third electrical resistance therebetween equal to about twice the first electrical resistance, the second input terminal of the comparator is earthed through a fourth electrical resistance equal to about twice the first electrical resistance, an output terminal of the comparator and the first input terminal of the comparator are connected having a fifth electrical resistance therebetween substantially equal to the first electrical resistance, and the output terminal of the comparator and the power supply voltage terminal are connected having a sixth electrical resistance therebetween having a lower resistance than the first electrical resistance.

7. The communication system of claim 5, wherein the second input terminal of the comparator is earthed through a third electrical resistance equal to about three times the first electrical resistance, the output terminal of the comparator and the first input terminal of the comparator are connected having a fourth electrical resistance therebetween equal to about twice the first electrical resistance, and the output terminal of the comparator and t he power supply voltage terminal are connected having a fifth electrical resistance therebetween substantially equal to the first electrical resistance.

8. A communication system for a vehicle, comprising:

a plurality of transceivers connected by a balanced cable for allowing communication between the transceivers;

reception means of at least one of said transceivers for obtaining a receive signal by differentially amplifying a signal from the balanced cable; and restrictive means operatively connected to said reception mans for limiting signals input to each of the input terminal of the reception means to values in mutually different fixed ranges.

9. The communication system of claim 8, wherein the restrictive means varies the fixed range at least at one said input terminal according to an output condition of the reception means.

10. The communication system of claim 9, wherein when the reception means has an H level output, an upper limit value of the fixed range at the first input terminal is set larger than an upper limit value of the fixed range at the second input terminal, and a lower limit value of the fixed range at the first input terminal is set between the upper limit value and a lower limit value of the fixed range at the second input terminal.

11. The communication system of claim 10, wherein when the reception means has an L level output, the upper limit value of the fixed range at the first input terminal is set between the upper limit value and the lower limit value of the fixed range at the second input terminal, and the lower limit value of the fixed range at the first input terminal is set lower than the lower limit value of the fixed range at the second input terminal.

12. The communication system of claim 8, wherein the first input terminal of the reception means and one wire of the balance cable are connected having a first electrical resistance therebetween, and the second input terminal of the reception means and another wire of the balance cable are connected having a second electrical resistance therebetween substantially equal to the first electrical resistance.

13. The communication system of claim 12, wherein the second input terminal of the reception means and a power supply voltage terminal are connected having a third electrical resistance therebetween equal to about twice the first electrical resistance, the second input terminal of the reception means is earthed through a fourth electrical resistance equal to about twice the first electrical resistance, an output terminal of the reception means and the first input terminal of the reception means are connected having a fifth electrical resistance therebetween substantially equal to the first electrical resistance, and the output terminal of the reception means and the power supply voltage terminal are connected having a sixth electrical resistance therebetween equal to a lower resistance than the first electrical resistance.

14. The communication system of claim 12, wherein the second input terminal of the reception means is earthed through a third electrical resistance having a resistance about three times the first electrical resistance, the output terminal of the reception means and the first input terminal of the reception means are connected having a fourth electrical resistance therebetween equal to about twice the first electrical resistance, and the output terminal of the reception means and the power supply voltage terminal are connected having a fifth electrical resistance therebetween substantially equal to the first electrical resistance.

15. A method of communicating on a vehicle having a plurality of transceivers connected by a balanced cable with at least two wires, comprising the steps of:

differentially amplifying a signal from the balanced cable via a comparator to obtain a receive signal at an output thereof; and limiting signals, received from the balanced cable, input to each input terminal of the comparator to values in mutually different fixed ranges.

16. The method of claim 15, further comprising varying the fixed range at least at one said input terminal according to an output condition of the comparator.

17. The method of claim 16, further comprising when the reception means has an H level output, setting an upper limit value of the fixed range at the first input terminal larger than an upper limit value of the fixed range at the second input terminal, and setting a lower limit value of the fixed range at the first input terminal between the upper limit value and a lower limit value of the fixed range at the second input terminal.

18. The method of claim 17, further comprising when the reception means has an L level output, setting the upper limit value of the fixed range at the first input terminal between the upper limit value and the lower limit value of the fixed range at the second input terminal, and setting the lower limit value of the fixed range at the first input terminal lower than the lower limit value of the fixed range at the second input terminal.

\* \* \* \* \*